(12) United States Patent
Chapman et al.

(10) Patent No.: US 9,357,511 B2
(45) Date of Patent: May 31, 2016

(54) TWO POWER CONTROL LOOPS FOR ANTENNA SWITCHING TRANSMIT DIVERSITY

(75) Inventors: Thomas Chapman, Southampton (GB); Terence Edwin Dodgson, Southampton (GB); Volker Franz, Munich (DE); Malgorzata Wimmer, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 430 days.

(21) Appl. No.: 13/141,070

(22) PCT Filed: Dec. 19, 2008

(86) PCT No.: PCT/EP2008/010956
§ 371 (c)(1),
(2), (4) Date: Jan. 18, 2012

(87) PCT Pub. No.: WO2010/069357
PCT Pub. Date: Jun. 24, 2010

(65) Prior Publication Data
US 2012/0106671 A1 May 3, 2012

(51) Int. Cl.
*H04B 1/02* (2006.01)
*H04W 52/42* (2009.01)
(Continued)

(52) U.S. Cl.
CPC .............. *H04W 52/42* (2013.01); *H04B 7/0404* (2013.01); *H04B 7/0602* (2013.01); *H04W 28/22* (2013.01); *H04B 7/0604* (2013.01); *H04B 7/0608* (2013.01); *H04B 2201/70701* (2013.01);
(Continued)

(58) Field of Classification Search
CPC ......... H04B 2201/70701; H04B 2201/709709; H04J 13/00; H04W 28/22; H04W 48/08; H04W 88/02; H04W 88/08
USPC ........................... 375/140, 295; 370/342, 347
See application file for complete search history.

(56) References Cited

U.S. PATENT DOCUMENTS 6,917,607 B1 * 7/2005 Yeom et al. .................... 370/342
7,697,486 B2 * 4/2010 Lee et al. ....................... 370/335
(Continued)

FOREIGN PATENT DOCUMENTS

EP          1906553 A1     4/2008
WO      WO 02/29990 A1   4/2002

OTHER PUBLICATIONS

International Search Report and Written Opinion dated Sep. 2, 2009 corresponding to International Patent Application No. PCT/EP2008/010956.

(Continued)

*Primary Examiner* — Ross Varndell
(74) *Attorney, Agent, or Firm* — Squire Patton Boggs (US) LLP (57) ABSTRACT

Two power control loops for antenna switching transmit diversity are realized by a user terminal including two antennas (110, 120), one power amplifier (140) for amplifying the signals to be transmitted from each of the antennas, and a switch (130) switching the transmission power of the power amplifier from one antenna to the other antenna. Accordingly, the user terminal is enabled to alternately transmit data packets, with its two antennas. A closed loop power control mechanism in the user terminal is adapted to update, on receipt of a transmission power control command from a base station, the transmission power relative to the level of two slots previously.

13 Claims, 3 Drawing Sheets

(51) Int. Cl.
*H04W 28/22* (2009.01)
*H04B 7/06* (2006.01)
*H04B 7/04* (2006.01)
*H04J 13/00* (2011.01)
*H04W 48/08* (2009.01)
*H04W 88/02* (2009.01)
*H04W 52/12* (2009.01)
*H04W 52/14* (2009.01)

(52) U.S. Cl.
CPC ..... *H04B2201/709709* (2013.01); *H04J 13/00* (2013.01); *H04W 48/08* (2013.01); *H04W 52/12* (2013.01); *H04W 52/146* (2013.01); *H04W 88/02* (2013.01)

(56) References Cited

U.S. PATENT DOCUMENTS

| | | | |
|---|---|---|---|
| 2002/0061005 A1* | 5/2002 | Lee et al. | 370/342 |
| 2006/0034382 A1* | 2/2006 | Ozluturk et al. | 375/267 |
| 2008/0080452 A1* | 4/2008 | Rofougaran | 370/342 |
| 2011/0237290 A1* | 9/2011 | Nishikawa et al. | 455/522 |

OTHER PUBLICATIONS

3GPP TS 25.211 V8.2.0 (Sep. 2008), Technical Specification, 3rd Generation Partnership Project; Technical Specification Group Radio Access Network; Physical Channels and Mapping of Transport Channels Onto Physical Channels (FDD), (Release 8), Sep. 2008, pp. 1-56.

3GPP TS 25.212 V8.3.0 (Sep. 2008), Technical Specification, 3rd Generation Partnership Project; Technical Specification Group Radio Access Network; Multiplexing and Channel Coding (FDD), (Release 8), Sep. 2008, pp. 1-104.

3GPP TS 25.213 V8.2.0 (Sep. 2008), Technical Specification, 3rd Generation Partnership Project; Technical Specification Group Radio Access Network; Spreading and Modulation (FDD), (Release 8), Sep. 2008, pp. 1-36.

3GPP TS 25.214 V8.3.0 (Sep. 2008), Technical Specification, 3rd Generation Partnership Project; Technical Specification Group Radio Access Network; Physical Layer Procedures (FDD), (Release 8), Sep. 2008, pp. 1-89.

3GPP TS 36.211 V8.4.0 (Sep. 2008), Technical Specification, 3rd Generation Partnership Project; Technical Specification Group Radio Access Network; Evolved Universal Terrestrial Radio Access (E-UTRA); Physical Channels and Modulation, (Release 8), Sep. 2008, pp. 1-78.

3GPP TS 36.212 V8.4.0 (Sep. 2008), Technical Specification, 3rd Generation Partnership Project; Technical Specification Group Radio Access Network; Evolved Universal Terrestrial Radio Access (E-UTRA); Multiplexing and Channel Coding, (Release 8), Sep. 2008, pp. 1-56.

3GPP TS 36.213 V8.4.0 (Sep. 2008), Technical Specification, 3rd Generation Partnership Project; Technical Specification Group Radio Access Network; Evolved Universal Terrestrial Radio Access (E-UTRA); Physical Layer Procedures, (Release 8), Sep. 2008, pp. 1-60.

3GPP TS 36.214 V8.4.0 (Sep. 2008), Technical Specification, 3rd Generation Partnership Project; Technical Specification Group Radio Access Network; Evolved Universal Terrestrial Radio Access (E-UTRA); Physical Layer—Measurements, (Release 8), Sep. 2008, pp. 1-11.

* cited by examiner

TWO POWER CONTROL LOOPS FOR ANTENNA SWITCHING TRANSMIT DIVERSITY

RELATED APPLICATION

This application was originally filed as PCT Application No. PCT/EP2008/010956 on Dec. 19, 2008, which is incorporated herein by reference in its entirety.

TECHNICAL FIELD OF THE INVENTION

The present invention relates to the technical field of communication networks. In particular the present invention relates to a user terminal for wireless communication, a method of transmitting data, and to a program element for adjusting a transmission power level of a user terminal.

BACKGROUND OF THE INVENTION

Spectrum scarcity has resulted in the demand for technologies which can make more efficient use of allocated bandwidths.

Multiple Input Multiple Output (MIMO) technology is reported to be such a technology, one which attempts to exploit multipath propagation effects to provide higher data throughput, whilst remaining spectrally efficient.

The generic term MIMO is sometimes used to refer to a number of technologies relating to multiple antennas. These include so-called "Spatial Multiplexing", in which multiple signals are transmitted over the same resources (Implemented in Wideband Code Division Multiple Access (WCDMA) as Double Transmit Antenna Array (D-TxAA)), "Transmit Diversity", in which the same information is transmitted over multiple channels (WCDMA example TxAA) and beamforming techniques.

By definition, spatial multiplexing MIMO technology works with multiple signals, the generation of which will lead to more user and system interference. Receivers working in such scenarios are likely to be more complex as a consequence. Current 3GPP WCDMA standards make use of all of these types of MIMO in the downlink (for example Transmit Diversity, TxAA, and Double Transmit Adaptive Array, D-TxAA, for High Speed Downlink Packet Access (HS-DPA)). Such MIMO schemes can improve throughput in the downlink.

The following documents of the 3GPP WCDMA standards can be considered as a basis for the invention.

The document TS 25.211 of the 3rd Generation Partnership Project (3GPP); Technical Specification Group Radio Access Network; Physical channels and mapping of transport channels onto physical channels (FDD), v8.2.0, 2008-09, Release 8, may describe the characteristics of the Layer 1 transport channels and physicals channels in the FDD mode of UTRA. The main objectives of the document may be to be a part of the full description of the UTRA Layer 1, and to serve as a basis for the drafting of the actual technical specification.

The document TS 25.212 of the 3rd Generation Partnership Project' (3GPP); Technical Specification Group Radio Access Network; Multiplexing and channel coding (FDD), v8.3.0, 2008-09, Release 8, may describe the characteristics of the Layer 1 multiplexing and channel coding in the FDD mode of UTRA.

The document TS 25.213 of the 3rd Generation Partnership Project (3GPP); Technical Specification Group Radio Access Network; Spreading and modulation (FDD), V8.2.0, 2008-09, Release 8 may describe spreading and modulation for UTRA Physical Layer FDD mode.

The document TS 25.214 of the 3rd Generation Partnership Project (3GPP); Technical Specification Group Radio Access Network; Physical layer procedures (FDD), V8.3.0, 2008-09, Release 8, may specify and establish the characteristics of the physicals layer procedures in the FDD mode of UTRA.

The document TS 36.211 of the 3rd Generation Partnership Project (3GPP); Technical Specification Group Radio Access Network; Evolved Universal Terrestrial Radio Access (E-UTRA); Physical Channels and Modulation, v8.4.0, 2008-09, Release 8, may describe the physical channels for evolved UTRA.

The document TS 36.212 of the $3^{rd}$ Generation Partnership Project (3GPP); Technical Specification Group Radio Access Network; Evolved Universal Terrestrial Radio Access (E-UTRA); Multiplexing and channel coding, V8.4.0, 2008-09, Release 8, may specify the coding, multiplexing and mapping to physical channels for E-UTRA.

The document TS 36.213 of the $3^{rd}$ Generation Partnership Project (3GPP); Technical Specification Group Radio Access Network; Evolved Universal Terrestrial Radio Access (E-UTRA), v8.4.0, 2008-09, Release 8, may specify and establish the characteristics of the physicals layer procedures in the FDD and TDD modes of E-UTRA.

The document TS 36.214 of the $3^{rd}$ Generation Partnership Project (3GPP); Technical Specification Group Radio Access Network; Evolved Universal Terrestrial Radio Access (E-UTRA); Physical layer—Measurements, v08.4.2, 2008-09, Release 8; may contain the description and definition of the measurements done at the UE and network in order to support operation in idle mode and connected mode.

SUMMARY OF THE INVENTION

It might be an object of the invention to provide improved transmission between a user terminal and a base station. It might be another object of the invention to provide a user terminal making efficiently use of its power resources and, at the same time, improve the communication quality.

These and other objects will be solved by the subject matter of each independent claim. Further embodiments are described in the respective dependent claims.

In general, a user terminal according to the invention includes at least two antennas, a power amplifier for amplifying the signals to be transmitted from one of the antennas, and a switch switching the transmission power of the power amplifier from one of the antennas to another one of the antennas.

A considerable aspect may be that the number of power amplifiers is at least one less than the number of antennas.

According to an embodiment of the invention, the user terminal comprises exactly two antennas and one power amplifier.

An advantage of such an arrangement may be that, for example, two antennas may be used in communication, i.e. in transmission and reception of data to and from a base station, wherein the transmission is amplified for both antennas by way of only one power amplifier. This will reduce the electronic parts in the user terminal and, therefore, will also reduce the costs for such a terminal.

According to an embodiment of the invention, the switch switches the transmission power according to a time sequence.

Switching according to a time sequence means that the power is switched between the antennas on times defined by the time sequence. The time sequence can be known to the base station or the base station controller. The time sequence can mean that switching is done every Mth slot of time transmission interval or any other time instant.

Accordingly, the switch may also switches the transmission power according to a condition. For example, it can be that the switching between the antennas is performed if a certain quality is above or below a threshold.

On the other hand, the switch of the user terminal may switch the transmission power slot by slot from one antenna to another antenna, or transmission time interval (TTI) by transmission time interval. It is noted, that switching may be done between antennas every second slot or TTI and so on, or any other interval of slots or TTIs.

Further, the user terminal may comprise an power control mechanism in which, on receipt of a transmission power control command, the transmission power for transmission via an Nth antenna is updated relative to the level of the previous time instant that was transmitting via said Nth antenna, wherein N is the number of antennas.

That is, the transmission power for transmission via first antenna is updated relative to the level of the previous time instant that was transmitting via said first antenna, and the transmission power for transmission via a second antenna is updated relative to the level of the previous time instant that was transmitting via said second antenna (and so on for N antennas).

It should be noted that the power control mechanism can be e.g. an inner loop power control mechanism or an outer loop power control mechanism or any other power control mechanism.

According to a further embodiment of the invention, in the power control mechanism of the user terminal, a tagging of transmission power control commands and/or uplink pilot sequences are used to disambiguate the slots to which the transmission power control commands relate.

According to a further embodiment of the invention, a radio network element and a radio network controller is provided, wherein the power control mechanisms consist of an inner and an outer loop component, wherein the outer loop component is managed from the network controller which signals a target value to the network element, and wherein two outer loop components are managed, and two targets are sent from the network controller to the network element, each relating to one of the two antennas.

According to yet another embodiment of the invention, a device to transmit power control commands to a user terminal is adapted to receive uplink data from the user terminal that is switching power between antennas, and to send a power control command for a specific time instant corresponding to the uplink transmission of a specific antenna, wherein the transmission power control commands may be tagged.

According to an aspect of the invention, the time sequence is known to said device, so that it can identify link antenna and time instant.

It should be noted that the device according to the invention might be a base station, a board or a chip.

According to another aspect of the invention, a method of transmitting data between a user terminal and a device is proposed, wherein the method comprises the steps of transmitting data from one of the at least two antennas of the user terminal, using a transmission power level, switching from the one antenna to another one of the at least two antennas, transmitting data from the other antenna of the user terminal, using a transmission power level.

For the device, the method may comprise the steps of: receiving uplink data from the user terminal, and sending a power control command for a specific time instant corresponding to the uplink transmission of a specific antenna, to the user terminal.

The method may further comprise the steps of adjusting the transmission power level of each antenna of the user terminal, on the basis of a receipt transmission power control command related to the transmission from said antenna. According to a further aspect of the invention, a program element is provided, which when being executed by a processor is adapted to carry out: adjusting a transmission power level for one of the at least two antennas and transmitting data from said antenna using the transmission power level, switching from the one antenna to another one of the at least two antennas, adjusting a next transmission power level for another one of the at least two antennas and transmitting data from the other antenna using the next transmission power level.

By means of the program element each transmission power level may be adjusted on the basis of a receipt transmission power control command related to the transmission from the respective antenna.

Therefore, the invention relates to a program element for a processing device, such that the method according to the invention might be executed on an appropriate system. The program element is preferably loaded into a working memory of a data processor. The data processor is thus equipped to carry out the method of the invention. Further, the program code of the program element may be stored on a computer readable medium, such as a CD-Rom. However, the program element may also be presented over a network like the worldwide web and can be downloaded into the working memory of a data processor from such a network.

It has also to be noted that exemplary embodiments of the present invention and aspects of the invention have been described with reference to different subject-matters. In particular, some embodiments have been described with reference to apparatus type claims whereas other embodiments have been described with reference to method type claims. However, a person skilled in the art will gather from the above and the following description that unless other notified in addition to any combination between features belonging to one type of subject-matter also any combination between features relating to different subject-matters in particular between features of the apparatus claims and the features of the method claims may be considered to be disclosed with this application.

These and other aspects of the present invention will become apparent from and elucidated with reference to the embodiments described hereinafter.

Exemplary embodiments of the present invention will be described in the following with reference to the following drawings.

DETAILED DESCRIPTION

The illustration in the drawings is schematic. In different drawings, similar or identical elements are provided with the same reference numerals.

The concept proposed herein, considers Transmit diversity for the uplink. In particular, so-called "Antenna switching" transmit diversity is considered.

The invention is thus related to Transmit diversity and "classical" Wideband Code Division Multiple Access (WCDMA) and the UL channel design which allows for joint operation of these two technology areas.

Since there are less implementation restrictions when considering multiple antennas for base stations, research has mostly focused on MIMO antennas and antenna arrays at the base station of cellular systems. The size of the user equipment or handset limits the number of antennas that can be deployed typically to one or two, when considering typical mobile communications operating frequencies and associated propagation environments. Never-the-less, certain MIMO techniques can still be deployed working within the required limitations, wherein one such technique is antenna switching.

With current, single antenna, mobiles, space diversity cannot be easily exploited. Using multiple antennas, appropriately spaced, and utilizing antenna switching, solves this problem. Through solving this problem the invention provides a means of decreasing user interference, which could map on to increasing user throughput, by effectively switching from one antenna to another in order to decorrelate the fading profile of alternate slots of data.

It can be assumed that the instantaneous fading over the two antennas is uncorrelated. The WCDMA uplink requires tight power control of all transmitted signals, using inner and outer loop power control. However if the terminal switches between uncorrelated antennas, then the power control loop will not be able to tightly control the power on either of the two channels.

Switching antennas on a regular basis, is known to result in enhanced signal reception because it introduces additional diversity in the received signal.

One example of a system that already employs antenna switching is TD-SCDMA. Another system is so called "LTE" or "Enhanced UTRAN". In TD-SCDMA, uplink power control is slow and open loop. In LTE, uplink power control is slow and based on long term statistics. The reason for this is that LTE employs frequency division multiplexing between users, whilst TD-SCDMA assumes the use of joint detection type receivers. Both of these types of receiver are not impacted by the so-called "near-far" problem of classic CDMA and WCDMA, and so tight control of received power that follows the fast fading channel is not needed.

Thus, for both of these systems, switching between two antennas and two uncorrelated fading channels does not impact power control as the power control is based on longer term statistics.

Therefore the prior art does not consider power control of the type used in 3GPP WCDMA uplink, since antenna switching for this scenario has not been considered. For WCDMA, it is essential to ensure that the inner loop power control closely follows the fast fading. There is currently no "double power control" scheme deployed in the Uplink of 3GPP WCDMA, to HSUPA.

Therefore, the Uplink of a cellular system such as 3GPP WCDMA is considered when utilizing HSUPA.

The WCDMA inner power control loop measures the SINR in each slot and sends an "up" or "down" command depending on whether the measured SINR is above or below the Node Bs SIR target, which is set by the outer loop power control. On receiving the TPC command, the terminal adjusts it's transmit power up or down relative to the power in the previous slot.

Figure 1:
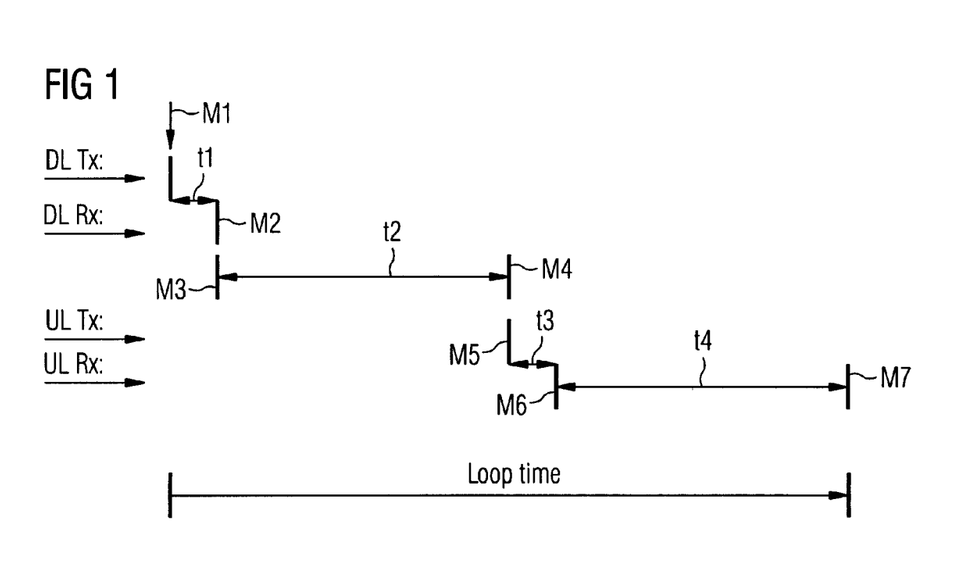
FIG. 1 shows a diagram illustrating the timing for one loop of transmission.

There is naturally a delay between the time at which the base station issues a TPC command and the time at which the received signal is adjusted according to the command, as shown in FIG. 1.

In order to ensure system stability, power transmit levels are usually set by the base station.

Referring to FIG. 1 there is shown one transmission loop with respect to the times necessary for each step of the loop. Accordingly, the time is running in horizontal direction in FIG. 1, and vertically separated, there are depict elements or processes involved in the transmission loop, one after another.

In detail, the starting point for the loop process might thus be taken as point M1 where the base station is ready to send a TPC command to the User Terminal, wherein DL Tx means downlink transmitter. The propagation of the TPC command needs the time t1, which constitutes a first delay.

At point M2, the user terminal will receive this data after experiencing said first propagation delay, wherein DL Rx stands for downlink receiver.

The maximum processing time t2 (between points M3 and M4) of the user terminal, which time is fixed for WCDMA, is an equivalent of 1024 chips. After said processing, the return signal will be sent from the user terminal at point M5, wherein UL TX means uplink transmitter.

The return signal will again experience a propagation delay t3 between points M5 and M6, before reaching the base station.

The base station processing time t4 (between points M6 and M7) is again restricted to an equivalent of 1024 chips. Thus the total round trip-time (equivalent in chips) to consider is 2*1024 chips+2*propagation time (equivalent in chips). A slot is 2560 chips in length and so, provided 2*propagation time is less than the equivalent of a 512 chip duration switching can be done on a slot-by-slot basis (with the further assumption that all the processing required of the terminal and the base station can be done in a 1024 chip period).

It should be noted that part of the delays consists of propagation delay. Considering a terminal in soft handover, where the propagation delays to different base stations are different, then base stations in the active set may experience the results of TPC commands at slightly different times.

The invention makes use of antenna switching in the uplink in order to exploit space diversity and thereby increase user throughput.

Switching Antennas for transmission, i.e. transmitting "slotbursts" of data from each antenna, is an attempt to decorrelate the fading profile of each alternate slot/burst, which, in turn can be translated into improved BLER through interleaving and channel coding.

There are a number of hardware arrangements that might be deployed for antenna switching. However, it is important to keep costs down in any system and this might be achieved, for the handset, through using the minimum hardware. In particular, for transmission, the antenna switching scheme would aim to limit the number of power amplifiers (ideally to one).

With this in mind, the simple antenna switching arrangement is shown in FIG. 1. The switching could be slot by slot as indicated earlier, or could be TTI by TTI (transmission time interval).

Figure 2:
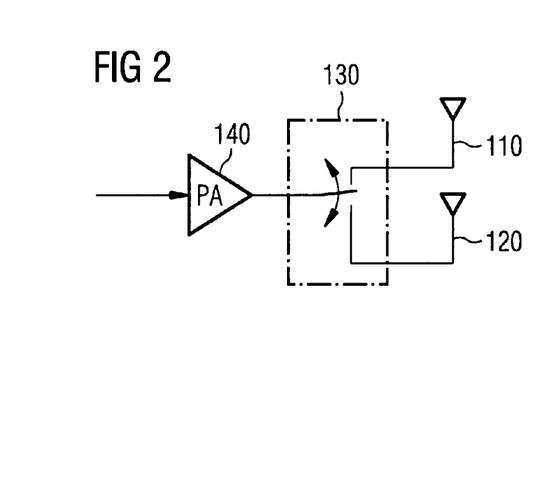
FIG. 2 shows a schematically representation of the elements for antenna switching.

As shown in FIG. 2 and in accordance with an embodiment of the invention, a user terminal comprises a power amplifier 140, an antenna switch 130, and two antennas 110, 120. The power amplifier 140 is connected with a base side of the switch 140. The two connectors between which the switch 130 may switch, are connected with one of the antennas, respectively. Therefore, the switch makes sure that the power amplifier 140 is either connected to the antenna 110 or to the other antenna 120.

Signals transmitted from each antenna will experience different propagation channels.

Consider firstly slot by slot switching. The fading channel profile will switch each slot. If the conventional power control loop is operated in which the user terminal implements a TPC command by adjusting it's transmit power compared to the previous slot, then the base station will not be able to control the uplink transmit power, because it will not be able to follow individually the fading paths from the two channels.

However, if the terminal adjusts it's transmit power relative to the level two slots ago, then it will adjust the power relative to the level last used when the terminal transmitted through the appropriate antenna. The base station can assume that alternate TPC commands implement separate inner power control loops for each of the two antennas.

Considering TTI by TTI switching, then in the first slot of a TTI, the terminal must adjust it's power relative to that used in the last slot of the last but one TTI, which will be the last TTI transmitted using the same antenna. For subsequent slots during the same TTI, the terminal should adjust it's transmit power relative to the power used in the previous slot. Again, this will enable the base station to separately control the power relating to the two transmit antennas separately.

A terminal having two antennas adequately spaced will thus require two power control mechanisms, one for each antenna (since, for uncorrelated antenna spacing, propagation channels experienced when transmitting from each antenna will be significantly different, i.e. different fading characteristics will be experienced leading to different transmit power requirements).

It is noted that an adequate space between two antennas of one user terminal might be approximately 2 (min)-2.5-15 cm.

In transmitting alternate TPC commands relating to different antennas, it is important to consider the delay effects illustrated in FIG. 1. The base station must ensure that the TPC command issued in the downlink at a particular moment in time will be implemented by the user terminal in the slot and with the antenna to which it relates. In particular in soft handover, where the propagation delays differ to different base stations it is important that the relationships between alternate TPCs and antennas is unambiguous.

One means for achieving unambiguous linkage is through precise specification of the timing. An alternative is to tag the downlink TPC commands.

This downlink control signal is tagged to identify to which antenna the power control command relates. Tagging sequences are thus unique to the associated antenna.

It is also possible that two unique user terminal pilot sequences may be required on the uplink, in order for the base station to be able to identify each antenna transmission and to be able to determine the transmit power levels required, if this is not possible by other means due to timing ambiguity.

Figure 3:
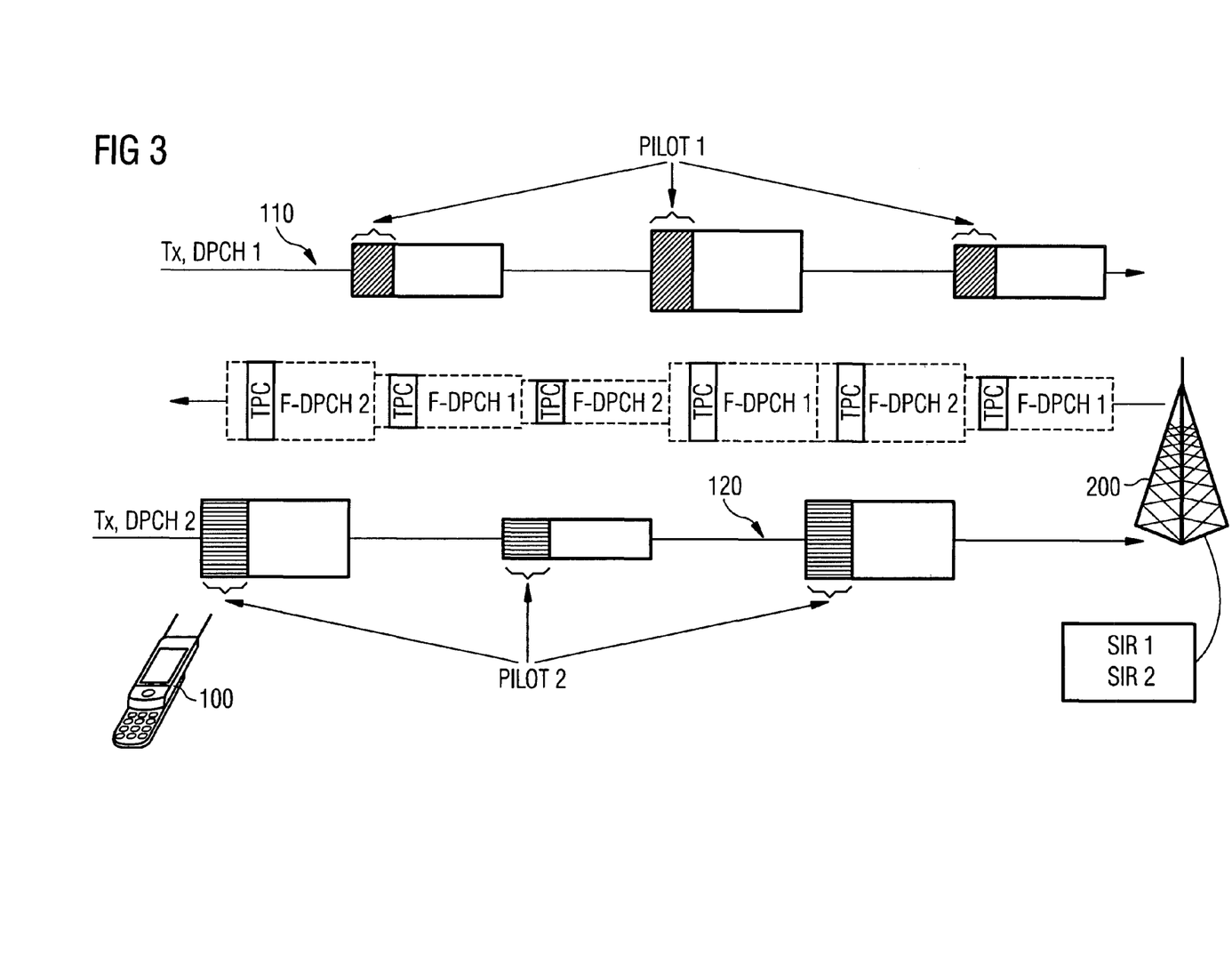
FIG. 3 shows an illustration of transmission packets between a user terminal and a base station.

FIG. 3 indicates transmissions required, wherein the tags are indicated through the use of separate fractional downlink physical channel (F-DPCH) identification, i.e. F-DPCH 1 and F-DPCH 2. The figure also has "dotted" lines around the F-DPCH's—this is to indicate that these channels are subject to discontinuous transmission (to conserve resource and reduce system interference).

In detail, FIG. 3 shows three rows, wherein the upper one is generally denoted with reference sign 110 and the lower one is generally denoted with reference sign 120. The upper row 110 relates, for example, to the first antenna of the user terminal 100, wherein the lower row relates to the second antenna. Therefore, row 110 and row 120 illustrate transmission coming from the first antenna and the second antenna, respectively, to the base station 200. The middle row illustrates transmission from the base station 200 to the user terminal 100.

Each of the upper and lower rows include rectangles divided in two sections, wherein the smaller one is indicated as a pilot signal and the remaining section illustrates data packet transmission. The thickness, i.e. the size in vertical direction, of the rectangles symbolize the transmit power lever, which may be higher (thick) or lower (thin).

The middle row is a row of response transmission with regard to each transmission from the antennas. Also here, the thickness of a single rectangular symbolizes a transmission power level of the respective transmission.

The transmission from the base station to the user terminal is divided in a TPC command and a rest indicating the channel, i.e. to what antenna signal the TPC command relates.

Figure 4:
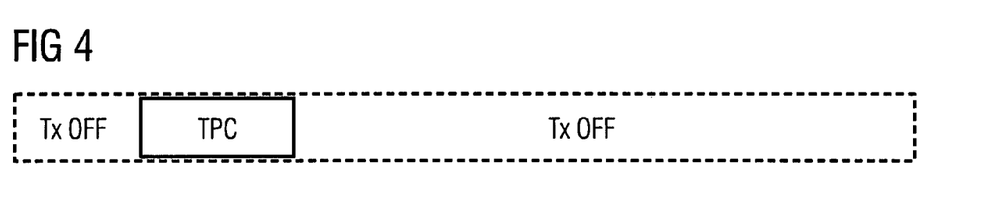
FIG. 4 shows an enlarged illustration of a fractional downlink physical channel.

FIG. 4 shows an enlarged view of one transmission from the base station to the user terminal.

In 3GPP WCDMA, outer loop Power Control implies the use of target Signal to Interference (SIR) values that are calculated by the RNC that are sent to the base stations in order to operate the inner loop power control in order to send associated power control commands fed back to the User Terminals so that they can determine their required transmit power levels.

Outer loop transmit power levels are usually set relative to a single reference channel level (for 3GPP WCDMA this would be the Dedicated Physical Control Channel (DPCCH). When operating with two antennas, this reference channel level concept can be retained, however, since the antennas are uncorrelated, the user terminal will in principle need to maintain two reference channel power levels, also switching appropriate parameters (e.g. other channel power offsets) as antennas are switched. For the Uplink, at the Node B, when working with one antenna a single, target, SIR value is usually specified relating to the User Terminal.

SIR values are updated according to CRC pass/fail indications received at the RNC. If the antenna switching is per TTI, then it is possible for the RNC to operate two outer power control loops and set two SIR targets.

Note that if the switching is per slot, then it is not possible to relate a CRC pass/fail over a TTI to a particular antenna and so it is not possible to operate two outer loops. The loss associated with less accuracy of the outer loop may be counterbalanced by the gain of faster switching.

Figure 5:
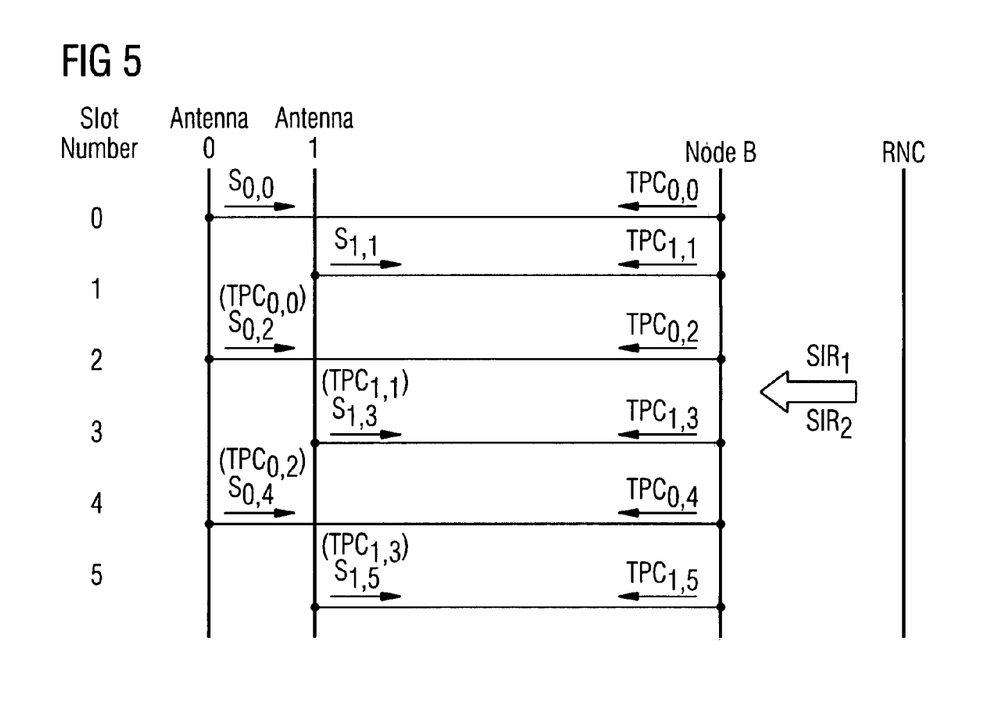
FIG. 5 shows an exemplary transmission sequence for two antennas, to a base station, with respective transmission power commands as a response from the base station to the two antennas.

The transmission sequence required in order to maintain two power control loops when using two user terminal antennas is indicated in FIG. 5.

FIG. 5 shows a sequence of several transmissions slot by slot from alternating antennas to a base station. Taking the start, arbitrarily, as slot 0, the user terminal transmits signal $S_{0,0}$ using the first antenna, antenna 0. Using full duplex transmission the user terminal receives (also during slot 0) the Transmission Power Control command, $TPC_{0,0}$, from the Node B. During the next slot, slot 1, the user terminal transmits signal $S_{1,1}$ from the second antenna, antenna 1, and again since the terminal is full duplex it receives during the same slot the Transmission Power Control command, $TPC_{1,1}$, from the Node B. During the next slot, slot 2, the user terminal transmits signal $S_{0,2}$ from the first antenna, using the power control command received two slots ago (i.e. $TPC_{0,0}$). During the next slot, slot 3, the user terminal transmits signal $S_{1,3}$ from the second antenna, using the power control command received two slots ago (i.e. $TPC_{1,1}$) and so on.

The RNC transmits SIR target values, $SIR_0$ and $SIR_1$, for antenna 0 and antenna 1 respectively after each TTI.

By way of such alternating transmission, the power required for correct the transmission might be reduced.

As a summary, the following main aspects are covered by the invention:

A WCDMA inner loop power control mechanism in which, on receipt of a TPC command the terminal updates it's TX power relative to the level 2 (or, to be generic N) slots previously;

A WCDMA inner loop power control, in which for the first slot of a TTI, on receipt of a TPC command the terminal adjusts its power relative to the last slot of the last but one TTI;

One of the aforementioned power control loops, in which a tagging of TPC commands, and if necessary UL pilot sequences is used to disambiguate the slots to which TPC commands relate;

A WCDMA outer loop power control, in which it is known at the RNC that alternate TTIs are transmitted on alternate antennas and the RNC maintains and updates two SIR targets.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

It should also be noted that reference signs in the claims shall not be construed as limiting the scope of the claims.

Acronyms and Terminology
3GPP 3$^{rd}$ Generation Project Partnership
BLER Block Error Rate
BS base station
BTS Base Transceiver Station (normally used for GSM)
DL Downlink
D-TxAA Double Transmit Antenna Array
F-DPCH Fractional Downlink Physical Channel
GSM Global System for Mobile Communications
HSDPA High Speed Downlink Packet Access
HSUPA High Speed Uplink Packet Access
MIMO Multiple Input Multiple Output
Node B Base Transfer Station (for UMTS/3GPP WCDMA)
PA Power Amplifier
RACH Random Access Channel
RNC Radio Network Controller
Rx Received/Receiver
SIR Signal to Interference Ratio
SNR Signal to Noise Ratio
TPC Transmit Power Control
TTI Transmission Time Interval
Tx Transmit/Transmitter
Ue User Equipment
UL Uplink
WCDMA Wideband Code Division Multiple Access

The invention claimed is:

1. A user terminal comprising:
   at least N antennas, wherein N is at least two,
   a power amplifier to amplify signals to be transmitted from one of the antennas,
   a switch configured to switch a transmission power of the power amplifier alternatively from one of the antennas to another one of the antennas, and
   a power control mechanism in which, on receipt of a transmission power control command sent at a slot of a plurality of slots in a time domain,
   the transmission power for transmission via an Nth antenna is updated antenna-specifically according to an individual transmission power control command received at least two slots ago at a time instant that the Nth antenna was transmitting.

2. The user terminal of claim 1, wherein the switch is configured to switch the transmission power according to a time sequence.

3. The user terminal of claim 2, wherein the switch is configured to switch at least one of the transmission power slot by slot and transmission time interval by transmission time interval, from one antenna to another antenna.

4. The user terminal of claim 1, wherein the power control mechanism is configured to tag at least one of the transmission power control commands, and uplink pilot sequences are used to identify at least one of a time instant and antenna to which the transmission power control commands relate.

5. A device configured to transmit power control commands to a user terminal, the device comprising:
   a radio network controller, configured to receive uplink data from the user terminal that is configured to switch power alternatively between antennas, and to send a power control command for at a slot of a plurality of slots in a time domain corresponding to the uplink data of a specific antenna,
   wherein a transmission power of uplink data via the specific antenna is updated antenna-specifically according to an individual transmission power control command sent at least two slots ago at a time instant that the specific antenna was transmitting.

6. The device of claim 5, wherein the power control commands are tagged to identify to which antenna the power control command relates.

7. The device of claim 5, further comprising a network element, wherein a component of a power control mechanism is managed from the radio network controller which signals a target value to the network element, relating to respective specific antenna.

8. A method of transmitting data between
   a user terminal comprising at least N antennas, wherein N is at least two, a power amplifier to amplify signals to be transmitted from one of the antennas, a switch configured to switch a transmission power of the power amplifier alternatively from one of the antennas to another one of the antennas, and a power control mechanism in which, on receipt of a transmission power control command sent at a slot of a plurality of slots in a time domain, the transmission power for transmission via an Nth antenna is updated antenna-specifically according to an individual transmission power control command received at least two slots ago at a time instant that the Nth antenna was transmitting, and a device configured to transmit power control commands to the user terminal, the device comprising a radio network controller, configured to receive uplink data from the user terminal that is configured to switch power alternatively between antennas, and to send a power control command for a specific time instant corresponding to the uplink data of a specific antenna, wherein a transmission power of uplink data via the specific antenna is updated antenna-specifically according to individual transmission power control command sent at a previous time instant that the specific antenna was transmitting, the method comprising:

transmitting data from one of the at least two antennas of the user terminal, using a transmission power level, switching alternatively from the one antenna to another one of the at least two antennas, and transmitting data from another antenna of the user terminal, using the transmission power level.

9. The method of claim 8, further comprising: receiving uplink data from the user terminal, and sending a power control command for a specific time instant corresponding to the uplink transmission of a specific antenna, from the device to the user terminal.

10. The method of claim 9, the method further comprises: adjusting the transmission power level of the specific antenna of the user terminal on the basis of a receipt transmission power control command related to the transmission from said specific antenna.

11. A non-transitory computer program product, which when being executed by a processor is adapted to carry out:

adjusting a transmission power level for one of at least two antennas and transmitting data from said one of the at least two antennas using the transmission power level, switching the transmission power level alternatively from one antenna to another one of the at least two antennas, adjusting a next transmission power level for another one of the at least two antennas on receipt of a transmission power control command sent at a slot of a plurality of slots in a time domain, and transmitting data from the other antenna using the next transmission power level, wherein a transmission power of transmission data via each of the at least two antennas is updated antenna-specifically according to a an individual transmission power control command received at least two slots ago at a time instant that the respective at least two antennas was transmitting data.

12. The non-transitory computer program product of claim 11, wherein each transmission power level is adjusted on the basis of a receipt transmission power control command related to the transmission from the respective antenna.

13. The non-transitory computer program product of claim 11, comprising program code being stored on a non-transitory computer-readable medium.

\* \* \* \* \*